(12) United States Patent
Jouanneau (10) Patent No.: US 11,469,671 B2
(45) Date of Patent: Oct. 11, 2022

(54) POWER MANAGEMENT METHOD OF AN INTEGRATED CIRCUIT, AND CORRESPONDING INTEGRATED CIRCUIT

(71) Applicant: STMicroelectronics (Alps) SAS, Grenoble (FR)

(72) Inventor: Thomas Jouanneau, ST-Egreve (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 17/324,782

(22) Filed: May 19, 2021

(65) Prior Publication Data
US 2021/0367518 A1    Nov. 25, 2021

(30) Foreign Application Priority Data

May 20, 2020   (FR) ...................................... 2005283

(51) Int. Cl.
*H02M 3/158* (2006.01)
*H02M 3/07* (2006.01)
*G06K 19/07* (2006.01)

(52) U.S. Cl.
CPC ........... *H02M 3/1582* (2013.01); *H02M 3/07* (2013.01); *G06K 19/0723* (2013.01)

(58) Field of Classification Search
CPC ........ H02M 3/1582; H02M 3/07; H02M 1/00; G01R 31/2851
See application file for complete search history.

(56) References Cited

U.S. PATENT DOCUMENTS

| | | | |
|---|---|---|---|
| 6,437,609 B1 | 8/2002 | Chehadi | |
| 10,622,899 B1* | 4/2020 | de Cremoux | .... G01R 19/16528 |
| 2009/0219079 A1 | 9/2009 | Bergler et al. | |
| 2011/0156803 A1* | 6/2011 | Yap | ........ H02M 3/073 |
| | | | 327/536 |
| 2020/0136502 A1* | 4/2020 | Liu | ......... H02M 1/32 |
| 2020/0161968 A1* | 5/2020 | Lin | ......... H02M 1/44 |
| 2020/0271700 A1* | 8/2020 | Shu | ........ H02M 3/156 |

FOREIGN PATENT DOCUMENTS

FR    2800214 A1    4/2001

* cited by examiner

*Primary Examiner* — Sibin Chen
(74) *Attorney, Agent, or Firm* — Slater Matsil, LLP

(57) ABSTRACT

The integrated circuit includes a first node intended to be biased at a first voltage, a second node intended to be biased at a second voltage and having a non-negligible capacitive coupling with the first node. A power supply management device comprises a voltage booster configured to boost a power supply voltage and comprising boost stages configured to generate intermediate voltages on intermediate nodes. A compatibility detection circuit is configured to detect compatibility between the second voltage and one of the intermediate voltages, and, if the second voltage is compatible with an intermediate voltage, to couple the at least one second node to the compatible intermediate node.

20 Claims, 5 Drawing Sheets

POWER MANAGEMENT METHOD OF AN INTEGRATED CIRCUIT, AND CORRESPONDING INTEGRATED CIRCUIT

CROSS-REFERENCE TO RELATED APPLICATIONS

This application claims priority to French Patent Application No. 2005283, filed on May 20, 2020, which application is hereby incorporated herein by reference.

TECHNICAL FIELD

Embodiments and implementations generally relate to integrated circuits and associated methods, and more particularly to management of an integrated circuit power supply.

BACKGROUND

Some nodes in integrated circuits can be brought to high voltages, for example above 10V (volts), while other nodes are maintained at constant lower voltages.

However, these nodes can have a large capacitive coupling, so that a parasitic current is injected into the node at constant low voltage, by capacitive effect, when the voltage increases in the node which is brought to a high voltage.

Typically, the parasitic current is simply discharged to ground, and is therefore lost.

This type of parasitic current is particularly likely to occur in large network structures, such as memory planes or pixel arrays, where nodes that can be brought to high voltages or maintained at a lower constant voltage may be numerous and variable depending on the use of the circuit.

SUMMARY

Structurally adapting the architectures of integrated circuits in order to limit the capacitive coupling between nodes is typically very restrictive, for example in terms of congestion.

In general, it is desirable to avoid energy losses, such as the leakage of parasitic capacitive current mentioned above, even more so in devices with low energy consumption, for example "contactless" type devices such as devices using RFID ("Radio Frequency Identification") or NFC ("Near Field Communication") technologies associated with standards well known to the person skilled in the art.

According to one aspect, provision is made of a method for managing an integrated circuit power supply, comprising a distribution of a first voltage on at least one first node, a distribution of a second voltage on at least one second node having a capacitive coupling with the at least one first node, and a boost of a power supply voltage using boost stages having intermediate voltages on intermediate nodes. The method further comprises a detection of a compatibility between the second voltage and at least one of the intermediate voltages, and, if the second voltage is compatible with at least one of the intermediate voltages, a coupling of the at least one second node to the intermediate node having the compatible intermediate voltage.

For example, the second voltage compatible with an intermediate voltage means that the second voltage has a value equal to, or close to within 5%, to the value of the intermediate voltage. More broadly, the second voltage and the intermediate voltage can be considered compatible if any difference between them is damaging neither for the functioning of the circuit on the second node, nor for the functioning of the circuit on the intermediate node.

In other words, it is proposed to reintroduce a parasitic capacitive current into a voltage boost circuit, to power supply the voltage boost circuit, in the event of a parasitic capacitive current flowing from a first node to a second node.

On the one hand, the detection of the compatibility of the voltages on the second node and on one of the intermediate nodes allows flexibility in the choice of the second node in the architecture of the integrated circuit and also in the choice of the intermediate node in the voltage boost stages.

The recovery of energy by reintroducing the parasitic capacitive current into the boost circuit can thus be optimized, both in the number of events producing a capacitive parasitic current to be reintroduced, and in the efficiency of the energy recovery.

Indeed, the choice of the second node can allow multiplying the parasitic current reintroductions, and the choice of the intermediate node allows optimizing the level of the intermediate stage.

Since boosting the power supply voltage is typically implemented by a charge pump type boost circuit, the higher the level of the intermediate stage, the greater the energy gain on the power supply.

The boost circuit can be configured to boost the power supply voltage, for example between 1V and 3V (volts), to the level of the first voltage, for example greater than 10V.

According to one implementation, the distribution of the second voltage comprises a regulation of the second voltage by a second regulator circuit, and, if the second voltage is compatible with at least one of the intermediate voltages, the method comprises a disconnection between the at least one second node and the second regulator circuit.

This allows in particular avoiding a conflict to flow the parasitic current between a ground terminal of the regulator circuit and the intermediate node.

According to one implementation, the coupling of the at least one second node to the intermediate node is performed before a charging phase of the first node comprising an increase in the voltage on the first node up to the level of the first voltage.

According to one implementation, the compatibility detection is performed on digital control signals controlling the value of the second voltage and the value of the at least one intermediate voltage.

Indeed, it is possible to program the compatibility detection in order to detect, on digital control signals, a parameterization of the integrated circuit wherein the value of the second voltage will be compatible with at least one of the intermediate voltages, for example specifically to the architecture of the integrated circuit and the operations of its functioning.

For example, the distribution of the first voltage comprises a first regulation, the distribution of the second voltage comprises a second regulation and the digital control signals comprise at least one of the following signals: a signal controlling the voltage boost; a signal controlling the first regulation; a signal controlling the second regulation.

Advantageously, the coupling of the at least one second node to the intermediate node is delayed by a delay allowing the charging of the at least one second node to the second voltage, upon detection of the compatibility.

Indeed, the voltages generated by analog devices, such as regulators and voltage boosters, typically have a reaction time relative to their digital controls. Thus, the delay added before the effective coupling of the second node with the intermediate node allows not imposing a sudden voltage drop on the intermediate node caused by a transient voltage on the second node, from a level lower than the level of the intermediate voltage.

According to another implementation, the compatibility detection comprises an analog comparison of instantaneous measurements of the voltages present on the nodes of the integrated circuit.

This implementation has the advantage of measuring real signals and therefore being very reliable, in return for an analog design, which is generally more cumbersome than digital designs.

For example, the instantaneous measurements comprise at least one of the following voltages: the voltage present on the at least one intermediate node; the voltage present on the at least one first node; the voltage present on the at least one second node.

According to another aspect, an integrated circuit is provided, including at least one first node intended to be biased at a first voltage, and at least one second node intended to be biased at a second voltage and having a capacitive coupling with the at least one first node, and a power supply management device comprising a voltage boost circuit configured to boost a power supply voltage and comprising boost stages configured to generate intermediate voltages on intermediate nodes. The power supply management device further comprises a compatibility detection circuit configured to detect compatibility between the second voltage and at least one of the intermediate voltages, and, if the second voltage is compatible with at least one of the intermediate voltages, to couple the at least one second node to the intermediate node having the compatible intermediate voltage.

According to one embodiment, the integrated circuit comprises a second regulator circuit configured to regulate the second voltage, and, if the second voltage is compatible with at least one of the intermediate voltages, a power supply management device is configured to disconnect the at least one second node and the regulator circuit.

According to one embodiment, the power supply management device is configured to couple the at least one second node to the intermediate node before a charging phase of the first node comprising an increase in the voltage on the first node up to the level of the first voltage.

According to one embodiment, the power supply management device is configured to detect the compatibility on digital control signals controlling the value of the second voltage and of the at least one intermediate voltage.

For example, the digital control signals comprise at least one of the following signals: a signal controlling the voltage boost circuit; a signal controlling a first regulator circuit configured to regulate the first voltage; a signal controlling a second regulator circuit configured to regulate the second voltage.

Advantageously, the power supply management device is configured to couple the at least one second node to the intermediate node after a delay allowing the charging of the at least one second node to the second voltage, upon detection of the compatibility.

According to one embodiment, the power supply management device is configured to detect compatibility between the second voltage and at least one of the intermediate voltages by measuring instantaneous values of the voltages present on nodes of the integrated circuit and by comparing the measured values.

For example, the power supply management device is configured to measure the instantaneous values of at least one of the following voltages: the voltage present on the at least one intermediate node; the voltage present on the at least one first node; the voltage present on the at least one second node.

BRIEF DESCRIPTION OF THE DRAWINGS

Other advantages and features of the invention will become apparent upon examining the detailed description of the embodiment and embodiment, which is in no way limiting, and of the appended drawings wherein.

DETAILED DESCRIPTION OF ILLUSTRATIVE EMBODIMENTS

Figure 1:
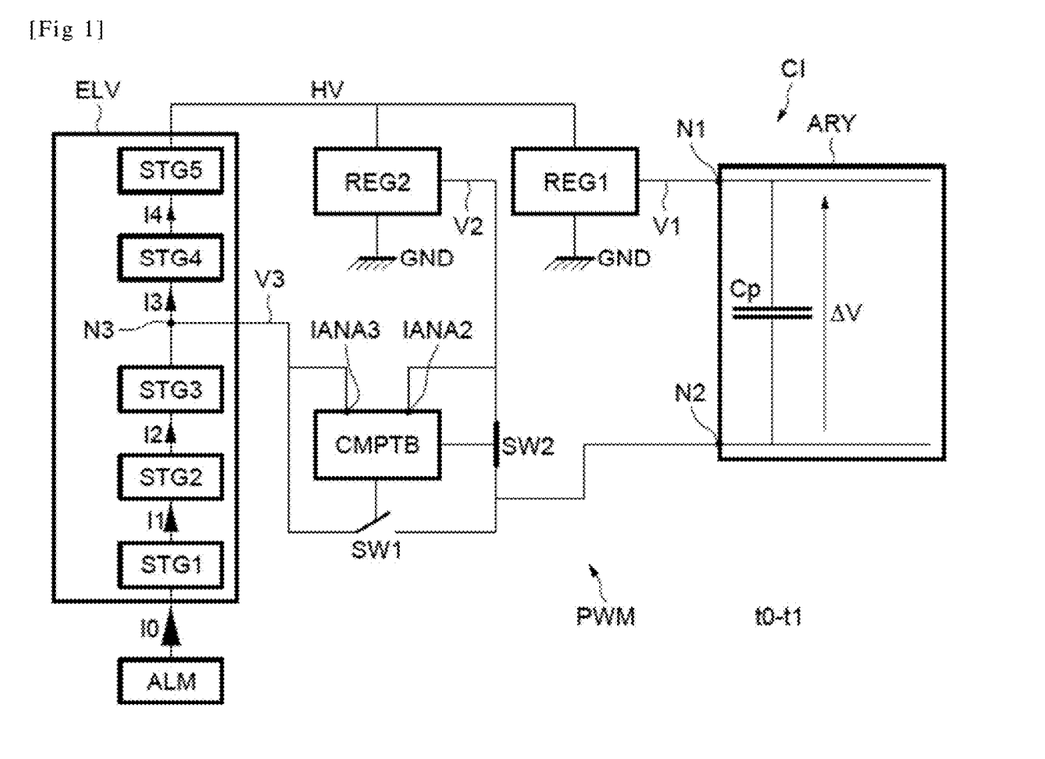
FIG. 1 illustrates an integrated circuit, including a voltage booster and a compatibility detection circuit, in an initial mode.
Figure 2:
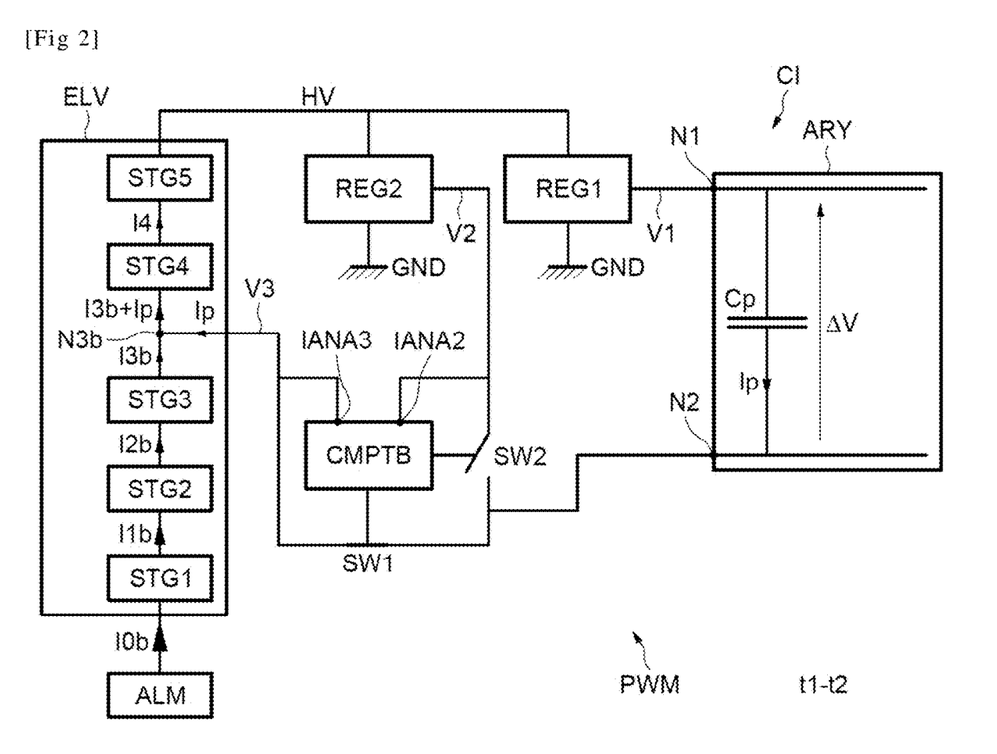
FIG. 2 illustrates an integrated circuit, including a voltage booster and a compatibility detection circuit, in an energy recovery mode.

FIGS. 1 and 2 illustrate an integrated circuit CI including in particular a voltage booster ELV and a compatibility detection circuit CMPTB configured to reintroduce, into the voltage boost circuit ELV, a parasitic capacitive current Ip flowing from a first node N1 to a second node N2.

Figure 3:
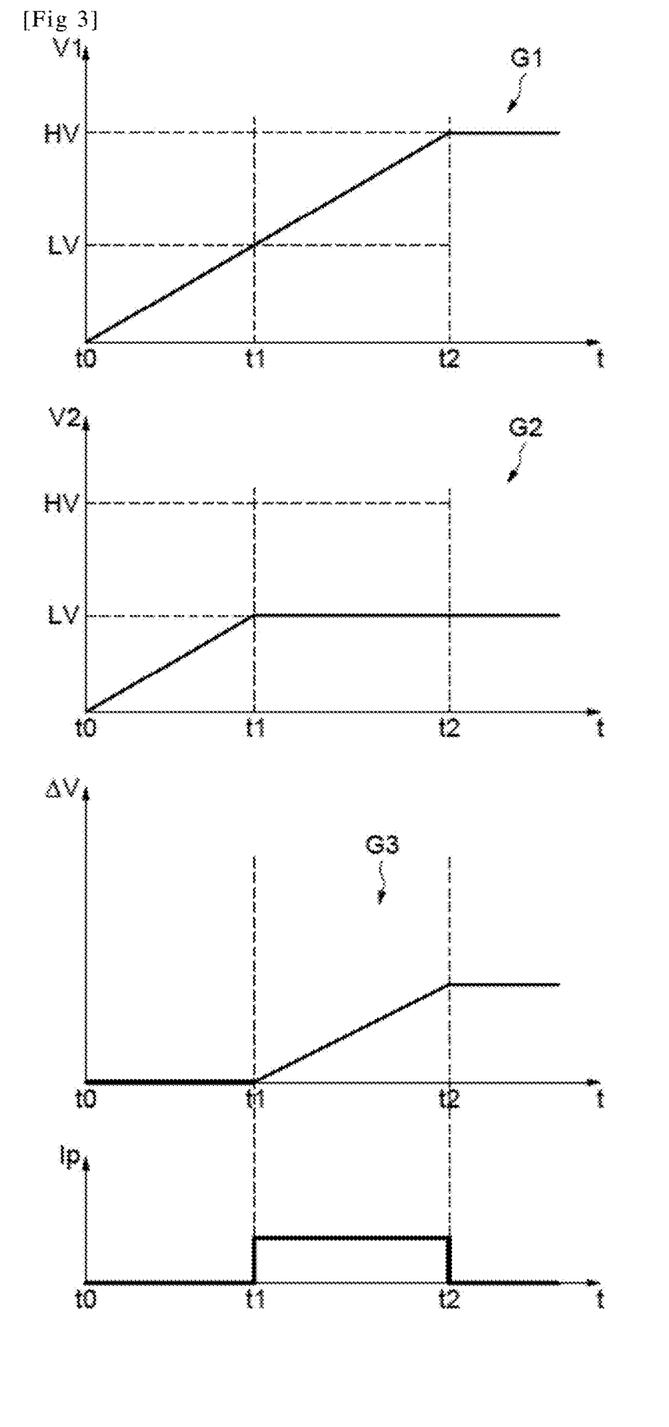
FIG. 3 illustrates a graph of the first and second node the voltages and the parasitic current as a function of time.

FIG. 3 shows a graph G1, G2, G3 illustrating the evolution of the voltages V1, V2 on the first and the second node N1, N2 and of the parasitic current Ip, as a function of time t, and in particular vis-à-vis instants t0, t1, t2 defined below.

FIG. 1 illustrates the integrated circuit CI in an initial mode (or conventional mode), between instants t0 and t1, while FIG. 2 illustrates the integrated circuit CI in an energy recovery mode, between instants t1 and t2.

FIGS. 1, 2 and 3 in particular will be described in relation to one another so as to illustrate a method for managing a power supply of the integrated circuit CI, wherein a parasitic capacitive current Ip flowing from a first node N1 to a second node N2 is reintroduced into the voltage boost circuit ELV.

The reintroduction of the parasitic current Ip into the boost circuit ELV allows reducing the energy consumption of the integrated circuit CI, which is advantageous in itself.

This allows in particular relieving a power supply stage ALM of the integrated circuit CI, which may have limited energy resources, for example in the case of a "contactless" power supplied integrated circuit, as for example defined in the standards associated with technologies called RFID and NFC (respectively for "Radio Frequency Identification" and "Near Field Communication," associated standards well known to the person skilled in the art).

The first node N1 and the second node N2 of the integrated circuit CI belong for example to a device including a matrix array of relatively large size ARY, such as typically a memory plane of a non-volatile memory, or a matrix of photosensitive or photoemitter pixels.

Indeed, this type of matrix array ARY device typically has parasitic capacitive coupling between nodes of the circuit, which are moreover difficult to avoid in terms of structural architecture.

The first node N1 and the second node N2 are selected to have a capacitive coupling Cp, which is for example non-zero.

Advantageously, the first node N1 and the second node N2 are selected to have a non-negligible capacitive coupling Cp, that is to say a capacitive coupling Cp which may result (with respect to the values of the first voltage V1 and of the second voltage V2 belonging to the normal conditions of use of the integrated circuit CI) in significant current leaks relative to the output current of the voltage boost circuit ELV. "Significant" means for example "at least of the same order of magnitude".

The boost circuit ELV is configured to boost a power supply voltage provided by a power supply ALM, to a higher level known as high voltage HV.

For example, the power supply ALM provides a low power supply voltage, for example between 1V and 3V (volt), while the boost circuit ELV provides a high voltage HV, for example of the order of 10V.

The boost circuit ELV is for example of the charge pump type, and includes boost stages STG1, STG2, STG3, STG4, STG5 in series, each configured to boost an input voltage from an elementary level. The outputs of each stage STG1-STG5 are thus at respective intermediate voltages, on respective intermediate nodes, in particular an intermediate voltage V3 on node N3 at the output of stage STG3.

Each boost stage STG1-STG5 cannot create power, and the input current I2 (for the stage STG3) is necessarily higher than the output current I3 (for the stage STG3).

According to a simplified functioning principle, if each boost stage STGk ($1 \leq k \leq 5$) is capable of providing at the output a current Ik equal to half of the current received at the input Ik−1, then the current I0-I5 decreases in a quadratic manner on the number of boost stages.

The input and output currents I0, I1, I2, I3, I4 of each boost stage have been schematically shown by an arrow, the size of which would be proportional to the intensity of the respective current.

For example, the current I0 budget provided by the power supply ALM for the voltage boost circuit ELV is 0.9 mA.

The first voltage V1 is distributed on the first node N1 for example via a first regulator circuit REG1 configured to regulate the high voltage HV leaving the boost circuit ELV. The first voltage V1 leaving the regulator REG1 is for example regulated at the same level as the high voltage HV, for example at 10V.

The second voltage V2 is distributed to the second N2 for example via a second regulator circuit REG2 configured to regulate the high voltage HV leaving the boost circuit ELV. The second voltage V2 leaving the regulator REG2 is regulated at a level lower than the level of the first voltage V1, for example at a level comprised between 5V and 7V.

Optionally, the second voltage V2 could be distributed by the second regulator circuit REG2, from other nodes than the output HV of the boost circuit ELV, for example from intermediate nodes of the voltage boost circuit or the first node N1.

In the initial mode t0-t1 shown by FIG. 1, the second node N2 is coupled to the output of the regulator REG2, by a switch SW2 controlled to be turned-on (that is to say closed) by the compatibility detection circuit CMPTB.

And, in the initial mode t0-t1, another switch SW3, connected between the second node N2 and an intermediate node N3 of the boost circuit ELV is controlled to be turned-off (that is to say open) by the compatibility detection circuit CMPTB.

Reference is made to FIG. 3 with FIG. 1.

At an instant to of the functioning of the integrated circuit, a distribution of the first voltage V1 at a level HV and of the second voltage V2 at a level LV is controlled. The control comes from a conventional control circuit, such as a microcontroller or an automaton usually called a state machine.

The first voltage V1 and the second voltage V2 do not instantly rise to the respective stable levels HV, LV, but have a charging time during which the voltages V1, V2 evolve in an increasing ramp before reaching the controlled level HV, LV.

The second voltage V2, shown in graph G2, reaches the level LV at instant t1; while the first voltage V1, shown in graph G1, reaches the level HV at instant t2, subsequent to t1.

The charging times of the first voltage V1 (t2-t0) and of the second voltage V2 (t1-t0) depend in particular on the analog functioning of the boost circuit ELV and of the regulator circuits REG1, REG2.

In this example, the shape of the ramp of the first voltage V1 and of the second voltage V2 is the same between the instants t0 and t1, in particular because the first voltage V1 and the second voltage V2 come from regulators REG1, REG2 power supplied by the same voltage HV coming out of the boost stage ELV. The shape of the ramps of the first voltage V1 and of the second voltage V2 can also result from the fact that the output of the boost circuit ELV is current limited.

The difference $\Delta V$ between the first voltage V1 and the second voltage V2, $\Delta V = V1 - V2$, shown by the graph G3, is consequently zero between the instants t0 and t1.

Thus, the parasitic current Ip, according to the equation $Ip = C \cdot dV/dt$ (with C the capacitive value of the parasitic capacitance Cp and $dV/dt$ the variation of $\Delta V$), is zero between instants t0 and t1.

On the other hand, from instant t1 to instant t2, the second voltage V2 is stable at the level LV, while the first voltage V1 continues to ramp up to the level HV.

The difference $\Delta V$ follows a linear variation and a constant parasitic capacitive current Ip has flowed from the first node N1 to the second node N2, between instants t1 and t2.

After the instant t2, the first voltage V1 remains constant at the controlled level HV, the difference $\Delta V$ also remains constant, and the parasitic current Ip is zero.

When the parasitic current Ip has flown, that is to say between the instants t1 and t2, if the power supply management device PWM remained in the mode illustrated in FIG. 1, then the parasitic current Ip would be evacuated to the ground GND of the integrated circuit by the second regulator REG2.

However, as mentioned above, the compatibility detection circuit CMPTB is configured to reintroduce the parasitic capacitive current Ip into the voltage boost circuit ELV.

In this regard, reference is made to FIG. 2 with FIG. 3.

FIG. 2 illustrates the integrated circuit CI in an energy recovery mode, between instants t1 and t2, that is to say when the parasitic capacitive current Ip is generated between nodes N1, N2 of the integrated circuit CI.

The compatibility detection circuit CMPTB is configured to detect compatibility between the second voltage V2 and at least one of the intermediate voltages of the boost circuit ELV. The example of a single intermediate voltage V3 leaving the antepenultimate (preceding the second-to-last) boost stage STG3 on the intermediate node N3 will be considered.

And, if the actual value of the second voltage V2 is detected to be compatible with the intermediate voltage V3, the compatibility detection circuit CMPTB is configured to couple the at least one second node N2 to the intermediate node N3. Advantageously, the compatibility detection circuit CMPTB is configured to simultaneously disconnect the second node N2 from the output of the regulator REG2.

In this regard, the compatibility detection circuit CMPTB controls the switch SW3 to be turned-on (closed) and, advantageously, the switch SW2 to be turned-off (open).

To be compatible with the intermediate voltage V3, the second voltage V2, stabilized at the controlled level LV, must be similar to the intermediate voltage V3, that is to say substantially equal, for example equal to 5%. Of course, the similarity threshold between the second voltage and the intermediate voltage will depend, on a case-by-case basis, on the architecture of the integrated circuit and the functioning of the signals on the nodes N2, N3. A person skilled in the art will know how to determine this similarity threshold accordingly.

Indeed, it is necessary on the one hand that the second voltage V2 does not disturb the functioning of the boost circuit ELV, for example a second voltage V2 that is too low would cause a drop in voltage on the intermediate node N3, and on the other hand that the intermediate voltage V3 does not disturb the functioning of the circuit ARY incorporating the second node N2 either.

Thus, the choice of the second node N2 will advantageously take this parameter into account, that is to say compatibility with at least one of the intermediate nodes N3 of the boost circuit.

In the example of FIGS. 1 and 2, the compatibility detection circuit CMPTB includes a first analog input IANA2 coupled to the output node (N2) of the regulator REG2, and a second analog input IANA3 coupled to the intermediate node N3.

In this exemplary embodiment and implementation, to evaluate the compatibility between the second voltage V2 and the intermediate voltage V3, the compatibility detection circuit CMPTB is configured to measure the instantaneous values of the voltages present on the nodes of the integrated circuit CI, in particular the second voltage V2 present on the second node N2, and the intermediate voltage V3 present on the intermediate node N3, and optionally the first voltage V1 present on the first node N1.

The compatibility detection circuit CMPTB is configured to compare the measured values, in order to identify an equality, or a similarity of the voltage values.

In this example, the compatibility detection circuit CMPTB includes a comparator circuit, for example typically of the operational amplifier type, configured to perform an all-or-nothing type comparison on the level of the second voltage V2 on the input IANA2, compared to the level of the intermediate voltage V3 on the input IANA3. The digital output signal of the comparator can thus control the switches SW2, SW3, inversely to each other.

Alternatively, the compatibility detection circuit CMPTB may include a dynamic comparator circuit, of conventional functioning based on comparison sampling, which is more energy efficient.

Analog comparator techniques, although conventionally relatively energy-consuming, have the advantage of being reliable, since they are based on a measurement of the voltages actually present on the nodes of the integrated circuit IC.

The compatibility detection circuit CMPTB is thus capable of detecting the instant t1 from which the second voltage V2 is compatible with the intermediate voltage V3 of the boost circuit ELV, and thus placing the power supply management device PWM in the energy recovery mode t1-t2.

In the energy recovery mode t1-t2, the parasitic capacitive current Ip is injected on the intermediate node N3, via the switch SW3 in the on state, as shown in FIG. 2.

And, again the currents I0, I1, I2, I3, I4, Ip present in the boost circuit ELV were schematically represented by an arrow whose size would be proportional to the intensity of the respective current.

The current Ip thus injected into the intermediate node N3 is added to the current I3$b$ leaving the stage STG3, and the upper stage STG4 benefits from a current of intensity I3$b$+Ip. Consequently, the stage STG3 provides a current I3$b$ lower than the current I3 (I3$b$=I3−Ip) of the conventional mode, illustrated by FIG. 1. The stage STG3 therefore consumes a lower current I2$b$ on its input than in conventional mode (I2$b$<I2), generated by the lower stage STG2. Likewise, the lower stage STG2 consumes a current I1$b$, generated by the first stage STG1, lower than in conventional mode (I1$b$<I1), and the first stage STG1 also consumes a current I0$b$ lower than the current I0 provided by the power supply ALM in conventional mode.

Each reduction in current I3$b$–I1$b$ on the output of each boost stage STG3-STG1 is amplified by a gain on the input, due to the quadratic decrease in current consumption explained above.

In other words, the difference between current I2$b$ and conventional current I2 is larger than the difference I3$b$–I3, I2$b$>I3$b$–I3, and likewise, I1$b$–I2$b$–I2, and thus I0$b$–I0>I1$b$–I1. Thus the gain on the current I0$b$ provided by the power supply ALM is much greater than the gross intensity of the parasitic current Ip reinjected into the boost circuit ELV (I0$b$–I0>>Ip).

For example, for a parasitic current Ip of approximately 13 µA (microampere) reinjected on the output of the second stage of a three-stage boost circuit, reflects a gain on the power supply ALM of 150 µA. For a budget of 0.9 mA, the 150 µA gain represents more than 15% of the budget.

The higher the intermediate node N3 on which the parasitic current Ip is reinjected into the series of boost stages STG1-STG5, the greater the gain on the power supply ALM will be.

Thus, the choice of the second node will advantageously take this parameter into account, that is to say be capable of having a voltage level corresponding to a high intermediate node of the voltage boost circuit ELV.

Overall, the second node(s) N2 will be selected taking into account the various parameters mentioned above, that is to say to have a capacitive coupling with a first one capable of generating a parasitic current of interest, and a compatibility with at least one of the intermediate nodes N3 of the boost circuit, and advantageously the highest possible.

Figure 4:
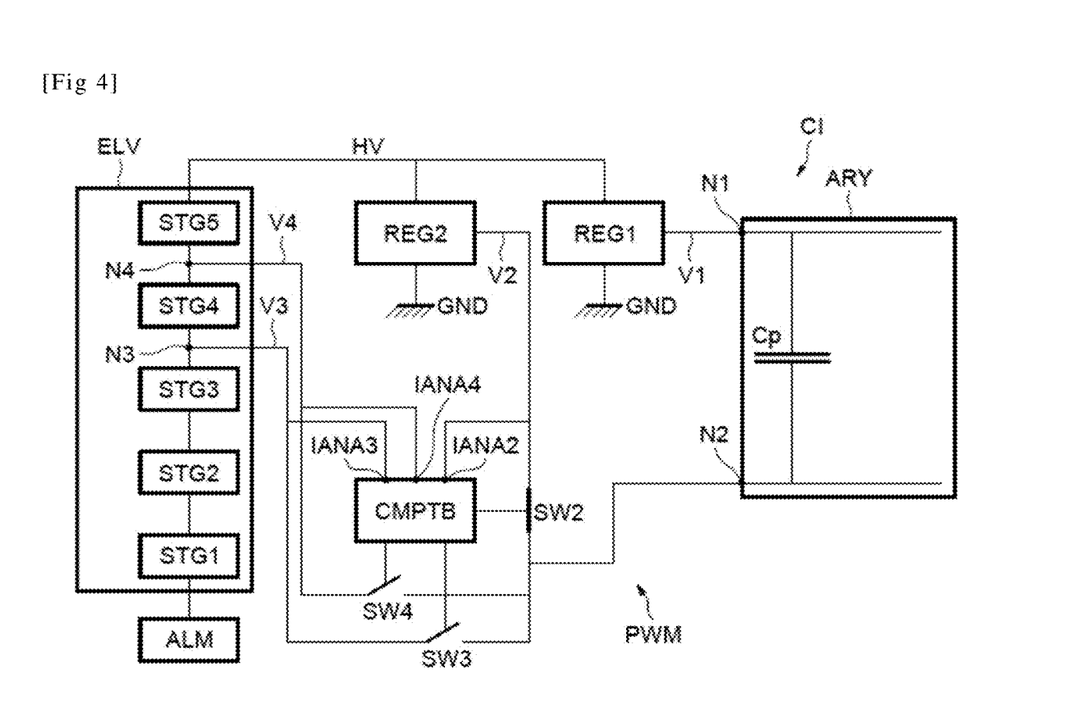
FIG. 4 illustrates an integrated circuit with a compatibility detection circuit capable of selecting an intermediate node compatible with the second voltage.

Reference is made to FIG. 4.

FIG. 4 illustrates an embodiment corresponding to the integrated circuit described previously in relation to FIGS. 1 and 2, wherein the compatibility detection circuit CMPTB is capable of selecting an intermediate node compatible with the second voltage V2, among several intermediate nodes N3, N4 of the boost circuit ELV.

In the example of FIG. 4, two intermediate nodes can be selected, one being node N3 on the output of the penultimate (second-to-last) boost stage STG4, the other being node N4 on the output of the antepenultimate (preceding the second-to-last) boost stage STG4. In another example, other intermediate nodes could be selected, for example all the intermediate nodes of the boost circuit ELV.

This allows multiplying the cases wherein a parasitic current Ip is generated, according to different levels of the second voltage V2, thus being able to be reinjected into different intermediate nodes N3, N4 of the boost circuit ELV.

In this embodiment, the compatibility detection circuit CMPTB includes an additional analog input IANA4, coupled to the additional intermediate node N4, in this example at the output of the second-to-last boost stage STG4.

An additional switch SW4, connected between the second N2 and the additional intermediate node N4 is controlled in the on or off state depending on whether or not a compatibility is detected between the second voltage V2 and the voltage on the additional intermediate node N4.

In this example, the compatibility detection is made by an analog comparison as described previously in relation to FIGS. 1 and 2.

Of course, in the case where other intermediate nodes (other than the illustrated nodes N3 and N4) can be selected, the compatibility detection circuit CMPTB is capable of coupling another intermediate node compatible with the second voltage V2, by means of other additional switches coupled between the respective other intermediate nodes and the second node N2.

Multiplying the number of analog inputs IANA3, IANA4 and the number of analog comparator circuits within the compatibility detection circuit CMPTB can be cumbersome and energy consuming. Thus, a limited number of intermediate nodes will advantageously be selected, the highest possible in the series of boost stages of the boost circuit ELV (such as the output nodes of the penultimate and antepenultimate boost stages SGT4, SGT3).

Figure 5:
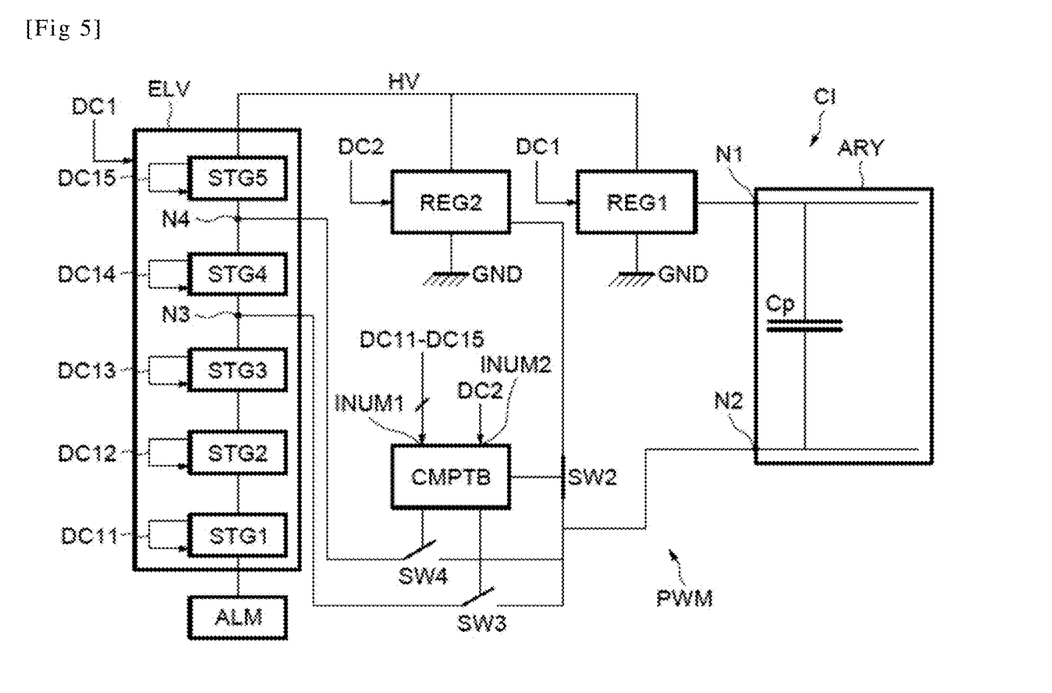
FIG. 5 illustrates an integrated circuit with a compatibility detection circuit configured to read digital control signals in order to detect a compatibility between the second voltage and at least one of the intermediate voltages.

FIG. 5 illustrates a preferred embodiment wherein the compatibility detection circuit CMPTB is configured to read digital control signals DC1, DC11-DC15, DC2 in order to detect a compatibility between the second voltage V2 and at least one of the intermediate voltages V3, V4 of the boost circuit ELV.

Except for the functioning of the compatibility detection circuit CMPTB, the integrated circuit CI has the example of architecture described above in relation to FIGS. 1 to 3, the same elements carrying the same references and not being detailed again here.

The compatibility detection circuit CMPTB is, for example, incorporated into a control and management circuit of the device ARY, such as a state machine or a microcontroller such as a programmer.

The first regulator REG1 receives a first digital control signal DC1 defining for example the stable level HV of the first voltage V1, the second regulator REG2 receives a second digital control signal DC2 defining for example the stable level LV of the second voltage V2.

Moreover, in this example it is considered that the first digital control signal DC1 is also received by the voltage boost circuit ELV in order to define the level of the high voltage HV.

The boost stages STG1-STG5 are typically each equipped with an internal regulation loop, from which internal digital regulation signals DC11-DC15 representative of the voltage levels on the respective intermediate nodes (in particular N3, N4) can be output.

Indeed, when the boost circuit ELV includes regulated intermediate nodes N3, N4, it is generally considered that there is a digital signal DC13, DC14 controlling the level of the regulated intermediate voltage on the intermediate nodes N3, N4.

For example, the internal regulation digital signals DC11-DC15 are of the type "on/off," that is to say when the target voltage is reached by the output node of the stage of the voltage boost STG1-STG5, the stage in question stops pumping (its internal clock is cut off). The stage does not resume pumping until the output voltage drops below a threshold.

And, knowing the functioning of the routines of the integrated circuit CI and the controls (or settings) of the voltage boost circuit ELV and of the regulators REG1, REG2, it is possible to know when the second node N2 and one of the intermediate nodes N3, N4 are equal, without making any analog measurement.

In this example, it is known that the regulator REG2 controls the second voltage V2 with the following conditions (with reference to FIG. 3):

$V2=V1$ when $V1<LV$;  Condition 1:

$V2=LV(\sim V3)$ when $V1>LV$  Condition 2:

Condition 2 can be detected by simply observing the digital control signals DC1, DC2 from the regulators REG1, REG2, and the digital internal regulation signals DC11-DC15 from the stages STG1-STG5 of the voltage boost circuit ELV.

In this example, the compatibility detection circuit CMPTB comprises in this regard a first input INUM1 receiving the digital control signal DC1 as well as the digital internal regulation signals DC11-DC15, and a second input INUM2 receiving the digital control signal DC2 of the second regulator REG2.

Indeed, if the digital control DC1 of the first regulator REG1 controls a first voltage V1 greater than the intermediate voltage LV on the intermediate node N3 (controlled by the digital internal regulation signal DC13), then condition 2 is recognized.

The compatibility detection circuit CMPTB can then connect the second node N2 to the corresponding intermediate node N3, and disconnect the second node N2 from the output of the second regulator REG2.

Of course, in the context of a different routine in the functioning of the integrated circuit, or of a second node N2 selected at another position of the device ARY, the compatibility detection device CMPTB is configured to connect the second node N2 with another intermediate node N4, the intermediate voltage of which is detected to be compatible with the second voltage V2 in particular by means of the corresponding digital internal regulation signal DC14.

However, since analog circuits such as regulators and voltage boosters may need time to react to digital controls, a delay may be added between the detection of a condition made on the digital signals, and the effective connection of the second node N2 on the intermediate node N3, N4 whose voltage is compatible with the second voltage V2.

Thus, the compatibility detection circuit CMPTB is advantageously configured to connect the second node N2 to the compatible intermediate node N3, after a delay t1-t0 (FIG. 3) from the detection of the compatibility conditions to. The delay t1-t0 is determined in order to allow the charging of the at least one second node N2 to the second voltage V2 at the stable level (LV).

Furthermore, and in a general manner applicable to the embodiments and implementations described in relation to FIGS. 1 to 4 and FIG. 5, the compatibility detection circuit CMPTB is configured to couple the second node N2 to the intermediate node N3 detected to be compatible, at instant t1 marking the start of a charging phase t2-t1 of the first node N1. The charging phase of the first node N1 comprises increasing the voltage on the first node N1 to the level of the first voltage V1 (HV), while the second voltage V2 is stable (LV). It is indeed during the charging phase t2-t1 that the potential difference ΔV between the first node N1 and the second node N2 varies, and consequently generates a parasitic capacitive current Ip.

In summary, the embodiments and implementations described above advantageously relate to integrated circuits power supplied in low voltages (for example less than 3V) while some internal functions such as non-volatile memories or image sensors require high internal voltages. To generate the high internal voltages, voltage boost circuits divided into several stages, such as charge pumps, are used. However, these circuits, which can consume a large amount of current, can pose a problem for low-energy applications such as contactless products, Internet of Things products, or the like. In the applications comprising a memory network or an image sensor, the nodes controlled to perform the function targeted by the network often have significant parasitic coupling due to the size of the network.

The embodiments and implementations described above allow taking advantage of the currents induced by the parasitic coupling to save energy. This parasitic capacitive current is reinjected into an intermediate stage of the appropriate boost circuit when this is possible and when this is useful, by the compatibility detection circuit. Consequently, the lower stages of the voltage boost circuit require less input current to maintain the voltage of the upper intermediate stage, which reduces the overall energy consumption.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    distributing a first voltage on at least one first node;
    distributing a second voltage on at least one second node having a capacitive coupling with the at least one first node;
    boosting a power supply voltage using boost stages having intermediate voltages on intermediate nodes;
    detecting a compatibility between the second voltage and at least one of the intermediate voltages; and
    in response to the second voltage being compatible with at least one of the intermediate voltages, coupling the at least one second node to a compatible intermediate node having a compatible intermediate voltage.

2. The method according to claim 1,
    wherein distributing the second voltage comprises regulating the second voltage by a second regulator circuit; and
    wherein the method further comprises disconnecting the at least one second node and the second regulator circuit.

3. The method according to claim 1, wherein coupling the at least one second node to the compatible intermediate node is performed before a charging phase of the first node comprising increasing a voltage on the first node up to a level of the first voltage.

4. The method according to claim 1, wherein detecting the compatibility is performed on digital control signals controlling a value of the second voltage, and values of the at least one of the intermediate voltages.

5. The method according to claim 4, wherein distributing the first voltage comprises a first regulation, distributing the second voltage comprises a second regulation, and the digital control signals comprise at least one of: a signal controlling a voltage boost, a signal controlling the first regulation, or a signal controlling the second regulation.

6. The method according to claim 4, wherein coupling the at least one second node to the compatible intermediate node is delayed by a delay allowing charging of the at least one second node to the second voltage.

7. The method according to claim 1, wherein detecting the compatibility comprises an analog comparison of instantaneous measurements of voltages present on the nodes of an integrated circuit.

8. The method according to claim 7, wherein the instantaneous measurements comprise at least one of: a voltage present on the at least one of the intermediate nodes, a voltage present on the at least one first node, or a voltage present on the at least one second node.

9. An integrated circuit comprising:
    at least one first node configured to be biased at a first voltage;
    at least one second node having a capacitive coupling with the at least one first node, and configured to be biased at a second voltage;
    a voltage boost circuit configured to boost a power supply voltage and comprising boost stages configured to generate intermediate voltages on intermediate nodes; and
    a compatibility detection circuit configured to:
        detect compatibility between the second voltage and at least one of the intermediate voltages; and
        in response to the second voltage being compatible with at least one of the intermediate voltages, couple the at least one second node to a compatible intermediate node having a compatible intermediate voltage.

10. The integrated circuit according to claim 9, further comprising a second regulator circuit configured to regulate the second voltage, wherein the compatibility detection circuit is configured to disconnect the at least one second node and the second regulator circuit.

11. The integrated circuit according to claim 9, wherein the compatibility detection circuit is configured to couple the at least one second node to the compatible intermediate node before a charging phase of the first node comprising an increase in a voltage on the first node up to a level of the first voltage.

12. The integrated circuit according to claim 9, wherein the compatibility detection circuit is configured to detect the compatibility on digital control signals controlling a value of the second voltage and values of the at least one of the intermediate voltages.

13. The integrated circuit according to claim 12, wherein the digital control signals comprise at least one of: a signal controlling the voltage boost circuit, a signal controlling a first regulator circuit configured to regulate the first voltage, or a signal controlling a second regulator circuit configured to regulate the second voltage.

14. The integrated circuit according to claim 12, wherein the compatibility detection circuit is configured to couple the at least one second node to the compatible intermediate node after a delay allowing charging of the at least one second node to the second voltage.

15. The integrated circuit according to claim 9, wherein the compatibility detection circuit is configured to detect compatibility between the second voltage and at least one of the intermediate voltages by measuring instantaneous values of the voltages present on nodes of the integrated circuit and by comparing the measured instantaneous values.

16. The integrated circuit according to claim 15, wherein the compatibility detection circuit is configured to measure the instantaneous values of at least one of: a voltage present on the at least one of the intermediate nodes, a voltage present on the at least one first node, or a voltage present on the at least one second node.

17. A method comprising:
   distributing a first voltage on a first node;
   distributing a second voltage on a second node having a capacitive coupling with the first node;
   boosting a power supply voltage using boost stages having intermediate voltages on intermediate nodes;
   detecting a compatibility between the second voltage and a compatible intermediate voltage; and
   in response to the second voltage being compatible with the compatible intermediate voltage, coupling the second node to a compatible intermediate node having the compatible intermediate voltage.

18. The method according to claim 17,
   wherein distributing the second voltage comprises regulating the second voltage by a second regulator circuit; and
   wherein the method further comprises disconnecting the second node and the second regulator circuit.

19. The method according to claim 17, wherein coupling the second node to the compatible intermediate node is performed before a charging phase of the first node comprising increasing a voltage on the first node up to a level of the first voltage.

20. The method according to claim 17, wherein detecting the compatibility is performed on digital control signals controlling a value of the second voltage, and values of the intermediate voltages.

* * * * *